May 6, 1941.  J. L. PRINGLE  2,241,317
BROILER
Filed Dec. 18, 1939
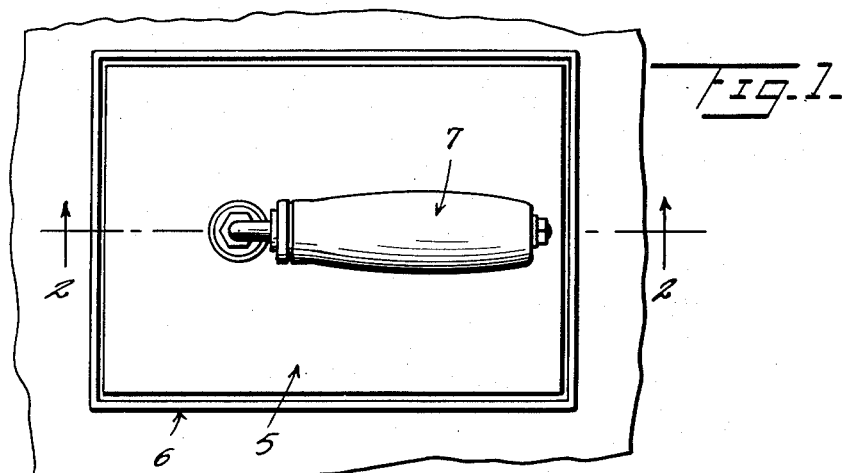
Fig. 1.
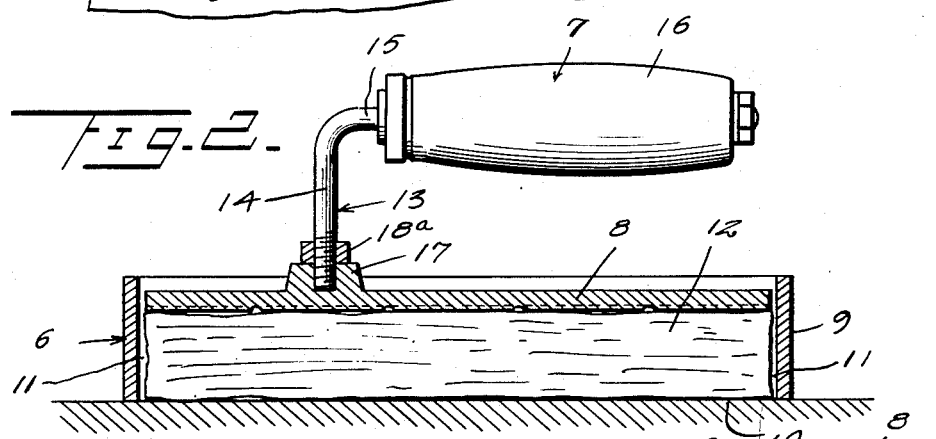
Fig. 2.
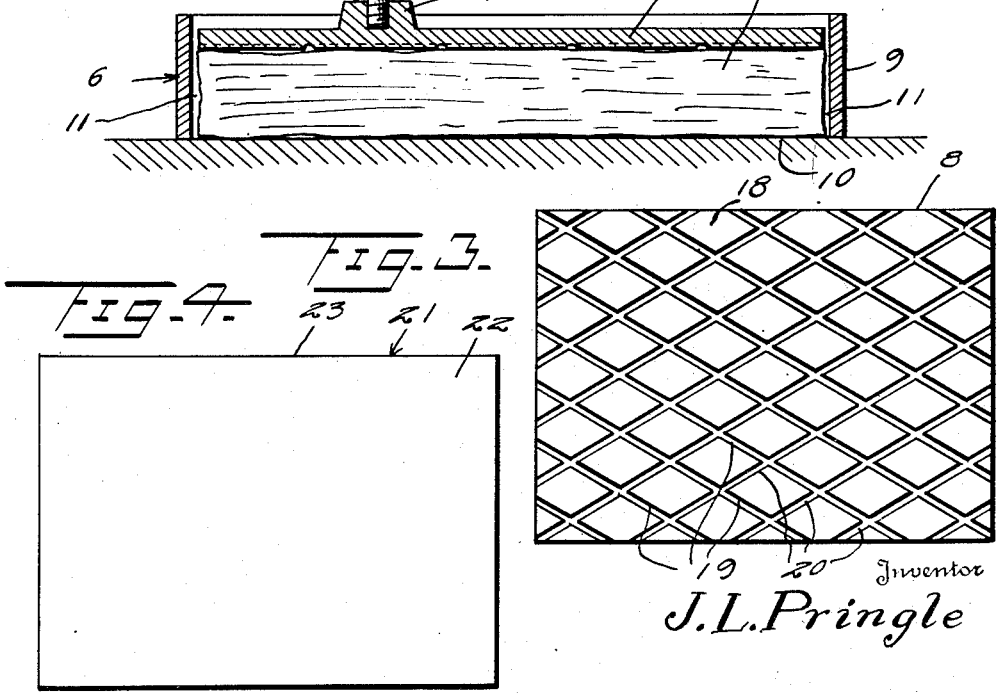
Fig. 3.
Fig. 4.
Inventor
J. L. Pringle
By Kimmel & Crowell
Attorneys Patented May 6, 1941

2,241,317

UNITED STATES PATENT OFFICE 2,241,317

BROILER

John L. Pringle, West Monroe, La.

Application December 18, 1939, Serial No. 309,906

1 Claim. (Cl. 53—5)

This invention relates to a broiler.

The invention aims to provide, in a manner as hereinafter set forth, a cooking device of the type referred to for not only to pressurally confine, but also to prevent escape of the flavor of and the moisture contents from the meat during the broiling operation.

The invention further aims to provide, in a manner as hereinafter set forth, a cooking device of the class referred to whereby when it is employed in connection with the broiling of meat will retain the original flavor and moisture content of the latter.

The invention further aims to provide, in a manner as hereinafter set forth, a cooking device of the class referred to which is simple in its construction and arrangement, strong, durable, compact, thoroughly efficient in its use, readily assembled and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown embodiments of the invention, but it is to be understood that changes, variations and modifications may be resorted to which fall within the scope of the invention as claimed.

In the drawing:

Figure 1 is a top plan view of the broiler, in accordance with this invention disposed in superimposed relation on a surface for applying heat to the broiler and to the article of food confined within the broiler, Figure 2 is a section on line 2—2 Figure 1, Figure 3 is an inverted plan of the combined closure and pressure applying means forming an element of the broiler, and Figure 4 is a view similar to Figure 3 of a modified form of a combined closure and pressure applying means.

The broiler, in accordance with this invention, and generally indicated at 5 consists of a meat confining element 6 and a removable combined closure and pressure applying element 7 for correlation with the element 6.

The element 6 may be of any suitable contour and is shown by way of example as of rectangular contour. The element 7 has a part, indicated at 8 constituting a closure for element 6 and an applicator for applying pressure to the meat during the broiling operation. The part 8 is to conform in contour to the contour of element 6. The latter is in the form of a frame 9, which at its bottom edge is disposed in superimposed relation on a surface 10 for heating the broiler and the article of food to be broiled. The frame 9 is of any desired height and forms a chamber 11 in which the meat 12 to be broiled is arranged. The meat 12 is to be mounted in superimposed relation on the surface 10, arranged within the chamber 11 and encompassed completely by the frame 9. The body of the latter will be of the desired thickness, which preferably will be uniform throughout. The frame 9 will be formed of any suitable material.

The element 7 not only includes the part 8, but also an angle-shaped bar 13 formed of a vertical leg 14 and a horizontally disposed leg 15 disposed at right angles to the upper end of leg 14 and in parallel spaced relation to the upper surface of the part 8. Secured upon the leg 15 is a handle member 16, which is spaced over part 8. The part 8 is of plate-like form and it has formed on its upper face between the transverse median of the latter and an edge portion of part 8 with an annular internally threaded boss 17. The lower portion of leg 14 is peripherally threaded for engagement wtih the threads of boss 17 whereby bar 13 is secured to part 8. A lock nut 18ª engages with leg 14 and abuts the boss 17. The lower face or surface 18 of part 8 is formed with grooves and by way of example such face 18 is provided with a pair of oppositely extending sets of spaced parallel grooves 19, 20 disposed diagonally thereof. The grooves of one set intersect the grooves of the other set. The grooves 19, 20 open at the edges of part 8. The part or plate 8 of the element 7 is constructed from any suitable material and its dimensions are slightly less than the inner dimensions of the frame 9. The part or plate 8 constitutes a closure for the chamber 11 during the broiling operation and when in closing position is disposed in superimposed relation with respect to the upper surface of the meat 12 and within the upper portion of frame 9 in close proximity to the inner face of the latter, as is shown by Figure 2.

The element 7 through the part or plate 8 thereof constitutes a pressure applying means or pressure applicator to the meat 12 during the broiling operation. The grooves 19, 20 maintain the moisture contents from the meat over the surface of the latter whereby when the meat is removed from the element 6, after being broiled substantially all of the moisture contents from the meat will be retained on its upper surface. The element 7 also functions to provide for the meat to retain substantially all of its flavor during the broiling operation. The grooves also act to relieve steam pressure on the part or plate 8 of element 7 so that the pressure applied by the latter on the meat will not be reduced. The grooves also provide for a slight exhaust, when desired of the steam derived from the broiling meat.

With reference to the modified form of combined closure and pressure applying element 21 shown by Figure 4, the construction of element 21 will be the same as the construction of element 6 with this exception that the lower surface 22 of the plate part 23 of element 21 is not grooved and is uninterrupted throughout.

What I claim is:

In a broiler, a horizontally disposed rectangular frame for seating its bottom edge in superimposed relation with respect to a heating surface and providing an open top and bottom chamber for confining the article being broiled and the extracts from such article, a rectangular plate removably arranged in the upper portion of said chamber for disposing its lower face in superimposed relation with respect to the article to apply pressure on the latter, the side and end edges of said plate being disposed in close proximity to the inner faces of the sides and ends of said frame for substantially closing the upper portion of said chamber, said plate having its lower face formed throughout with oppositely disposed sets of spaced parallel intersecting diagonal grooves, the grooves of each set opening at side and end edges and at diagonally opposed corners of the plate, and a handle means connected with the upper face of said plate.

JOHN L. PRINGLE.